(12) United States Patent
Grigg et al.

(10) Patent No.: US 9,595,025 B2
(45) Date of Patent: *Mar. 14, 2017

(54) SORTING MOBILE BANKING FUNCTIONS INTO AUTHENTICATION BUCKETS

(71) Applicant: BANK OF AMERICA CORPORATION, Charlotte, NC (US)

(72) Inventors: David M. Grigg, Rock Hill, SC (US); Joseph Neil Johansen, Rock Hill, SC (US); Michael E. Toth, Charlotte, NC (US); Daniel Lynn Carpenter, Matthews, NC (US); Hood Qaim-Maqami, Montclair, NJ (US); Carrie Anne Hanson, Charlotte, NC (US); Elizabeth S. Votaw, Potomac, MD (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,138

(22) Filed: Feb. 4, 2016

(65) Prior Publication Data
US 2016/0171460 A1    Jun. 16, 2016

Related U.S. Application Data

(63) Continuation of application No. 14/175,956, filed on Feb. 7, 2014, now Pat. No. 9,305,149.

(51) Int. Cl.
*G06F 12/14* (2006.01)
*G06Q 20/10* (2012.01)
(Continued)

(52) U.S. Cl.
CPC ........... *G06Q 20/108* (2013.01); *G06F 21/30* (2013.01); *G06F 21/31* (2013.01); *G06Q 40/02* (2013.01);
(Continued)

(58) Field of Classification Search
CPC ....... G06Q 20/108; G06F 21/30; G06F 21/31; H04L 63/08
(Continued)

(56) References Cited

U.S. PATENT DOCUMENTS 5,437,346 A   8/1995 Dumont
6,256,670 B1  7/2001 Davies
(Continued)

OTHER PUBLICATIONS

Office Action dated Aug. 27, 2015 for U.S. Appl. No. 14/175,701.
(Continued)

*Primary Examiner* — Abu Sholeman
(74) *Attorney, Agent, or Firm* — Michael A. Springs; Moore & Van Allen PLLC; Peter B. Stewart

(57) ABSTRACT

Embodiments are directed to systems, methods and computer program products for sorting mobile banking functions into authentication buckets. Embodiments determine, for each of a plurality of mobile banking functions, a corresponding authentication buckets, where each authentication bucket corresponds with a level of authentication. Some embodiments receive a request, from a user, to access a function; access the plurality of authentication buckets to determine which of the authentication buckets corresponds with the requested function; determine the level of authentication associated with the determined authentication bucket; determine which authentication types are associated with the level of authentication; request authentication credentials corresponding to the authentication types; receive authentication credentials from the user; validate the authentication credentials, thereby resulting in a successful validation of the authentication credentials; and, in response to the successful validation of the authentication credentials, enable access to the function requested by the user.

11 Claims, 6 Drawing Sheets

(51) Int. Cl.
*G06F 21/30* (2013.01)
*G06F 21/31* (2013.01)
*H04L 29/06* (2006.01)
*G06Q 40/02* (2012.01)
*G06F 17/00* (2006.01)

(52) U.S. Cl.
CPC ............ *H04L 63/08* (2013.01); *H04L 63/083* (2013.01); *H04L 63/0853* (2013.01); *H04L 63/105* (2013.01); *G06F 2221/2113* (2013.01); *G06F 2221/2149* (2013.01); *H04L 2463/102* (2013.01)

(58) Field of Classification Search
USPC ........................................ 726/1, 26; 707/626
See application file for complete search history.

(56) References Cited

U.S. PATENT DOCUMENTS

| | | | |
|---|---|---|---|
| 6,422,462 | B1 | 7/2002 | Cohen |
| 6,651,168 | B1 * | 11/2003 | Kao ........................ G06F 21/32 713/155 |
| 6,748,367 | B1 | 6/2004 | Lee |
| 7,058,806 | B2 | 6/2006 | Smeets et al. |
| 7,111,323 | B1 | 9/2006 | Bhatia et al. |
| 7,231,202 | B2 | 6/2007 | Natsuno |
| 7,239,226 | B2 | 7/2007 | Berardi et al. |
| 7,373,515 | B2 | 5/2008 | Owen et al. |
| 7,472,081 | B1 | 12/2008 | Cason |
| 7,529,741 | B2 | 5/2009 | Aravamudan et al. |
| 7,546,276 | B2 | 6/2009 | Randle et al. |
| 7,599,287 | B2 | 10/2009 | Testa et al. |
| 7,627,505 | B2 | 12/2009 | Yoshida et al. |
| 7,693,771 | B1 | 4/2010 | Zimmerman et al. |
| 7,697,920 | B1 | 4/2010 | McClain |
| 7,698,443 | B1 | 4/2010 | Yaffe et al. |
| 7,716,180 | B2 | 5/2010 | Vermeulen et al. |
| 7,738,382 | B2 | 6/2010 | Le Faucheur et al. |
| 7,783,281 | B1 | 8/2010 | Cook et al. |
| 7,930,264 | B2 | 4/2011 | Geppert |
| 7,988,045 | B2 | 8/2011 | Connell, II et al. |
| 8,012,219 | B2 | 9/2011 | Mendez et al. |
| 8,156,335 | B2 | 4/2012 | Lin |
| 8,165,945 | B2 | 4/2012 | Collins et al. |
| 8,201,232 | B2 | 6/2012 | Zhang et al. |
| 8,214,650 | B2 | 7/2012 | Dickinson et al. |
| 8,244,210 | B2 | 8/2012 | Ayanamcottil et al. |
| 8,261,093 | B1 | 9/2012 | Dhesi et al. |
| 8,270,995 | B1 | 9/2012 | Manroa et al. |
| 8,286,227 | B1 | 10/2012 | Zheng |
| 8,295,812 | B1 | 10/2012 | Jones |
| 8,295,898 | B2 | 10/2012 | Ashfield et al. |
| 8,307,412 | B2 | 11/2012 | Ozzie et al. |
| 8,332,272 | B2 | 12/2012 | Fisher |
| 8,352,323 | B2 | 1/2013 | Fisher |
| 8,352,730 | B2 | 1/2013 | Giobbi |
| 8,369,833 | B2 | 2/2013 | McClain |
| 8,380,177 | B2 | 2/2013 | Laracey |
| 8,412,626 | B2 | 4/2013 | Hirson et al. |
| 8,423,466 | B2 | 4/2013 | Lanc |
| 8,442,915 | B2 | 5/2013 | Takatori et al. |
| 8,483,194 | B1 | 7/2013 | Wu et al. |
| 8,483,663 | B1 | 7/2013 | Jones |
| 8,485,438 | B2 | 7/2013 | Dollard |
| 8,601,602 | B1 | 12/2013 | Zheng |
| 8,644,506 | B2 | 2/2014 | Zellner |
| 8,660,358 | B1 | 2/2014 | Bergboer et al. |
| 8,682,802 | B1 | 3/2014 | Kannanari |
| 8,683,571 | B2 | 3/2014 | Zapata et al. |
| 8,744,968 | B1 | 6/2014 | Grigg et al. |
| 8,768,838 | B1 | 7/2014 | Hoffman |
| 8,769,270 | B2 | 7/2014 | Orsini et al. |
| 8,850,575 | B1 * | 9/2014 | Magi Shaashua ..... G06Q 10/00 455/456.1 |
| 8,869,241 | B2 | 10/2014 | Davis et al. |
| 8,869,305 | B1 | 10/2014 | Huang |
| 8,881,306 | B2 | 11/2014 | Feldman et al. |
| 8,930,271 | B1 | 1/2015 | Ellis et al. |
| 8,973,102 | B2 | 3/2015 | Jakobsson |
| 2001/0049711 | A1 | 12/2001 | Nishihara |
| 2002/0077978 | A1 | 6/2002 | O'Leary et al. |
| 2002/0111907 | A1 | 8/2002 | Ling |
| 2002/0157029 | A1 | 10/2002 | French et al. |
| 2002/0174073 | A1 | 11/2002 | Nordman et al. |
| 2002/0186845 | A1 | 12/2002 | Dutta et al. |
| 2003/0045328 | A1 | 3/2003 | Natsuno |
| 2003/0065805 | A1 | 4/2003 | Barnes, Jr. |
| 2003/0163708 | A1 | 8/2003 | Tang |
| 2005/0119978 | A1 | 6/2005 | Ates |
| 2006/0030333 | A1 | 2/2006 | Ward et al. |
| 2006/0036868 | A1 | 2/2006 | Cicchitto |
| 2007/0055594 | A1 | 3/2007 | Rivest et al. |
| 2007/0094152 | A1 | 4/2007 | Bauman et al. |
| 2007/0100773 | A1 | 5/2007 | Wallach |
| 2007/0113275 | A1 | 5/2007 | Khanna et al. |
| 2007/0156842 | A1 | 7/2007 | Vermeulen et al. |
| 2007/0168677 | A1 | 7/2007 | Kudo et al. |
| 2007/0194884 | A1 | 8/2007 | Didier et al. |
| 2007/0219984 | A1 | 9/2007 | Aravamudan et al. |
| 2007/0250920 | A1 | 10/2007 | Lindsay |
| 2007/0277232 | A1 | 11/2007 | Cates et al. |
| 2008/0167965 | A1 | 7/2008 | Von Nothaus et al. |
| 2008/0293397 | A1 | 11/2008 | Gajdos et al. |
| 2008/0319889 | A1 | 12/2008 | Hammad |
| 2009/0019534 | A1 | 1/2009 | Bakshi et al. |
| 2009/0076965 | A1 | 3/2009 | Elson et al. |
| 2009/0100529 | A1 | 4/2009 | Livnat et al. |
| 2009/0117883 | A1 | 5/2009 | Coffing |
| 2009/0150286 | A1 | 6/2009 | Barton |
| 2009/0187492 | A1 | 7/2009 | Hammad et al. |
| 2009/0199264 | A1 | 8/2009 | Lang |
| 2009/0217346 | A1 | 8/2009 | Manring et al. |
| 2009/0241178 | A1 | 9/2009 | Burch et al. |
| 2009/0254975 | A1 | 10/2009 | Turnbull et al. |
| 2010/0064345 | A1 | 3/2010 | Bentley et al. |
| 2010/0100897 | A1 | 4/2010 | Manuel-Devadoss |
| 2010/0122333 | A1 | 5/2010 | Noe |
| 2010/0257099 | A1 | 10/2010 | Bonalle et al. |
| 2010/0330958 | A1 | 12/2010 | Corda et al. |
| 2011/0016534 | A1 | 1/2011 | Jakobsson et al. |
| 2011/0099104 | A1 | 4/2011 | Nybom |
| 2011/0137804 | A1 | 6/2011 | Peterson |
| 2011/0142234 | A1 | 6/2011 | Rogers |
| 2011/0159846 | A1 | 6/2011 | Kemshall |
| 2011/0166992 | A1 | 7/2011 | Dessert et al. |
| 2011/0167440 | A1 | 7/2011 | Greenfield |
| 2011/0208601 | A1 | 8/2011 | Ferguson et al. |
| 2011/0270618 | A1 | 11/2011 | Banerjee et al. |
| 2011/0320296 | A1 | 12/2011 | Edwards |
| 2012/0030109 | A1 | 2/2012 | Dooley Maley et al. |
| 2012/0054057 | A1 | 3/2012 | O'Connell et al. |
| 2012/0089514 | A1 | 4/2012 | Kraemling et al. |
| 2012/0095916 | A1 | 4/2012 | Dorsey et al. |
| 2012/0120880 | A1 | 5/2012 | Lee et al. |
| 2012/0137340 | A1 | 5/2012 | Jakobsson et al. |
| 2012/0144468 | A1 | 6/2012 | Pratt et al. |
| 2012/0160912 | A1 | 6/2012 | Laracey |
| 2012/0171237 | A1 | 7/2012 | Ching et al. |
| 2012/0173551 | A1 | 7/2012 | Haddorp et al. |
| 2012/0174237 | A1 | 7/2012 | Krzyzanowski |
| 2012/0179558 | A1 | 7/2012 | Fischer |
| 2012/0197743 | A1 | 8/2012 | Grigg et al. |
| 2012/0197794 | A1 | 8/2012 | Grigg et al. |
| 2012/0230539 | A1 | 9/2012 | Calman et al. |
| 2012/0239576 | A1 | 9/2012 | Rose et al. |
| 2012/0254941 | A1 | 10/2012 | Levien et al. |
| 2012/0254943 | A1 | 10/2012 | Li |
| 2012/0260318 | A1 | 10/2012 | Fromentoux et al. |
| 2012/0265585 | A1 | 10/2012 | Muirbrook et al. |
| 2012/0300938 | A1 | 11/2012 | Kean et al. |
| 2012/0316963 | A1 | 12/2012 | Moshfeghi |
| 2013/0007874 | A1 | 1/2013 | Purvis |
| 2013/0013498 | A1 | 1/2013 | Fisher et al. |

(56) References Cited

U.S. PATENT DOCUMENTS

| | | |
|---|---|---|
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0042314 A1 | 2/2013 | Kelley |
| 2013/0060689 A1 | 3/2013 | Oskolkov et al. |
| 2013/0060708 A1 | 3/2013 | Oskolkov et al. |
| 2013/0085927 A1 | 4/2013 | Scott |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0111208 A1 | 5/2013 | Sabin et al. |
| 2013/0138627 A1 | 5/2013 | Zaydman et al. |
| 2013/0143621 A1 | 6/2013 | Kumaran |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179954 A1 | 7/2013 | Bidare |
| 2013/0188485 A1 | 7/2013 | Midani et al. |
| 2013/0198056 A1 | 8/2013 | Aldrey et al. |
| 2013/0212007 A1 | 8/2013 | Mattsson et al. |
| 2013/0219454 A1 | 8/2013 | Hewinson |
| 2013/0267204 A1 | 10/2013 | Schultz et al. |
| 2013/0290361 A1 | 10/2013 | Anderson et al. |
| 2014/0129357 A1 | 5/2014 | Goodwin |
| 2014/0130127 A1 | 5/2014 | Toole et al. |
| 2014/0172707 A1 | 6/2014 | Kuntagod et al. |
| 2014/0173704 A1 | 6/2014 | Adams et al. |
| 2014/0187148 A1 | 7/2014 | Taite et al. |
| 2014/0188719 A1 | 7/2014 | Poomachandran et al. |
| 2014/0208401 A1 | 7/2014 | Balakrishnan et al. |
| 2014/0214640 A1 | 7/2014 | Mallikarjunan et al. |
| 2014/0244503 A1 | 8/2014 | Sadlier |
| 2014/0245391 A1 | 8/2014 | Adenuga |
| 2014/0250009 A1 | 9/2014 | Carlson |
| 2014/0279270 A1 | 9/2014 | Bertanzetti et al. |
| 2014/0279476 A1 | 9/2014 | Hua |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0359709 A1 | 12/2014 | Nassar et al. |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0100495 A1 | 4/2015 | Salama et al. |
| 2015/0100788 A1 | 4/2015 | Chastain et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0171049 A1 | 6/2015 | Wasserman et al. |
| 2015/0206131 A1 | 7/2015 | Phillips et al. |
| 2015/0213474 A1 | 7/2015 | Howe |

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2011.

QThru.com. "QThru: use your mobile smartphone for self-checkout" http://www.qthru.comi. QThru.com © 2011. 6 pages. Retrieved Mar. 22, 2013.

Zimmerman, Ann. "Check Out the Future of Shopping: Shaving Time Off the Weekly Grocery Run to Keep consumers in Stores and Spending." http://online.wsj.com/article/SB10001424052748703421204576329253050637400.html. 5 pages. Retrieved Mar. 22, 2011.

\* cited by examiner

SORTING MOBILE BANKING FUNCTIONS INTO AUTHENTICATION BUCKETS

CROSS-REFERENCE TO RELATED APPLICATIONS

This application is a continuation of U.S. patent application Ser. No. 14/175,956, filed Feb. 7, 2014; the contents of which are hereby incorporated by reference.

BACKGROUND

In the new technological age, the security of personal information, or the lack thereof, has become an issue that concerns many people. As a result, several business industries, such as financial institutions, have taken precautionary measures to ensure the safety and protection of their customers' information. This is typically accomplished by verifying a user's identity prior to transferring any personal information using an electronic means.

BRIEF SUMMARY

Embodiments of the invention are directed to sorting mobile banking functions into authentication buckets. According to embodiments of the invention, an apparatus includes a memory; a processor; and a module stored in the memory, executable by the processor, and configured to determine, for each of a plurality of mobile banking functions, a corresponding one of a plurality of authentication buckets; wherein each of the plurality of authentication buckets corresponds with one of a plurality of levels of authentication, which together comprise a continuum of authentication.

In some embodiments, the module is further to receive a request, from a user, to access one of the plurality of functions; access the plurality of authentication buckets to determine which of the authentication buckets corresponds with the requested function; determine the level of authentication associated with the determined authentication bucket; determine which one or more authentication types from a plurality of authentication types are associated with the level of authentication associated with the determined authentication bucket; request one or more authentication credentials corresponding to the determined one or more authentication types; receive one or more authentication credentials from the user; validate the one or more authentication credentials, thereby resulting in a successful validation of the one or more authentication credentials; and, in response to the successful validation of the one or more authentication credentials, enable access to the function requested by the user.

In some embodiments, the module is further configured to initiate presentation of a user interface illustrating at least one of the plurality of authentication buckets and at least one of the functions corresponding to the at least one authentication bucket.

In some embodiments, the module is further configured to receive user input selecting one of the plurality of authentication buckets for one of the plurality of functions.

In some embodiments, the module is further configured to initiate presentation of a user interface illustrating a set of available buckets for one of the plurality of functions based at least in part on predetermined thresholds of authentication corresponding to the function.

In some embodiments, the module is further configured to initiate presentation of a predetermined recommended authentication bucket for the at least one of the functions, the predetermined recommended authentication bucket being different from the at least one authentication bucket corresponding to the at least one of the functions.

In some embodiments, the module is further configured to initiate presentation of a representation of a percentage of a plurality of customers of a financial institution administering the mobile banking functions that have selected each of a plurality of available authentication buckets for one of the plurality of functions.

According to embodiments of the invention, a method for sorting mobile banking functions into authentication buckets includes determining, for each of a plurality of mobile banking functions, a corresponding one of a plurality of authentication buckets; wherein each of the plurality of authentication buckets corresponds with one of a plurality of levels of authentication, which together comprise a continuum of authentication.

In some embodiments, the method includes receiving a request, from a user, to access one of the plurality of functions; accessing the plurality of authentication buckets to determine which of the authentication buckets corresponds with the requested function; determining the level of authentication associated with the determined authentication bucket; determining which one or more authentication types from a plurality of authentication types are associated with the level of authentication associated with the determined authentication bucket; requesting one or more authentication credentials corresponding to the determined one or more authentication types; receiving one or more authentication credentials from the user; validating the one or more authentication credentials, thereby resulting in a successful validation of the one or more authentication credentials; and, in response to the successful validation of the one or more authentication credentials, enabling access to the function requested by the user.

In some embodiments, the method includes initiating presentation of a user interface illustrating at least one of the plurality of authentication buckets and at least one of the functions corresponding to the at least one authentication bucket.

In some embodiments, the method includes receiving user input selecting one of the plurality of authentication buckets for one of the plurality of functions.

In some embodiments, the method includes initiating presentation of a user interface illustrating a set of available buckets for one of the plurality of functions based at least in part on predetermined thresholds of authentication corresponding to the function.

In some embodiments, the method includes initiating presentation of a predetermined recommended authentication bucket for the at least one of the functions, the predetermined recommended authentication bucket being different from the at least one authentication bucket corresponding to the at least one of the functions.

In some embodiments, the method includes initiating presentation of a representation of a percentage of a plurality of customers of a financial institution administering the mobile banking functions that have selected each of a plurality of available authentication buckets for one of the plurality of functions.

According to embodiments of the invention, a computer program product for sorting mobile banking functions into authentication buckets includes a non-transitory computer-readable medium comprising code causing a first apparatus to determine, for each of a plurality of mobile banking functions, a corresponding one of a plurality of authentication buckets; wherein each of the plurality of authentication buckets corresponds with one of a plurality of levels of authentication, which together comprise a continuum of authentication.

In some embodiments, the code further causes the first apparatus to receive a request, from a user, to access one of the plurality of functions; access the plurality of authentication buckets to determine which of the authentication buckets corresponds with the requested function; determine the level of authentication associated with the determined authentication bucket; determine which one or more authentication types from a plurality of authentication types are associated with the level of authentication associated with the determined authentication bucket; request one or more authentication credentials corresponding to the determined one or more authentication types; receive one or more authentication credentials from the user; validate the one or more authentication credentials, thereby resulting in a successful validation of the one or more authentication credentials; and, in response to the successful validation of the one or more authentication credentials, enable access to the function requested by the user.

In some embodiments, the code further causes the first apparatus to initiate presentation of a user interface illustrating at least one of the plurality of authentication buckets and at least one of the functions corresponding to the at least one authentication bucket.

In some embodiments, the code further causes the first apparatus to receive user input selecting one of the plurality of authentication buckets for one of the plurality of functions.

In some embodiments, the code further causes the first apparatus to initiate presentation of a user interface illustrating a set of available buckets for one of the plurality of functions based at least in part on predetermined thresholds of authentication corresponding to the function.

In some embodiments, the code further causes the first apparatus to initiate presentation of a predetermined recommended authentication bucket for the at least one of the functions, the predetermined recommended authentication bucket being different from the at least one authentication bucket corresponding to the at least one of the functions.

BRIEF DESCRIPTION OF THE DRAWINGS

Figure 1A:
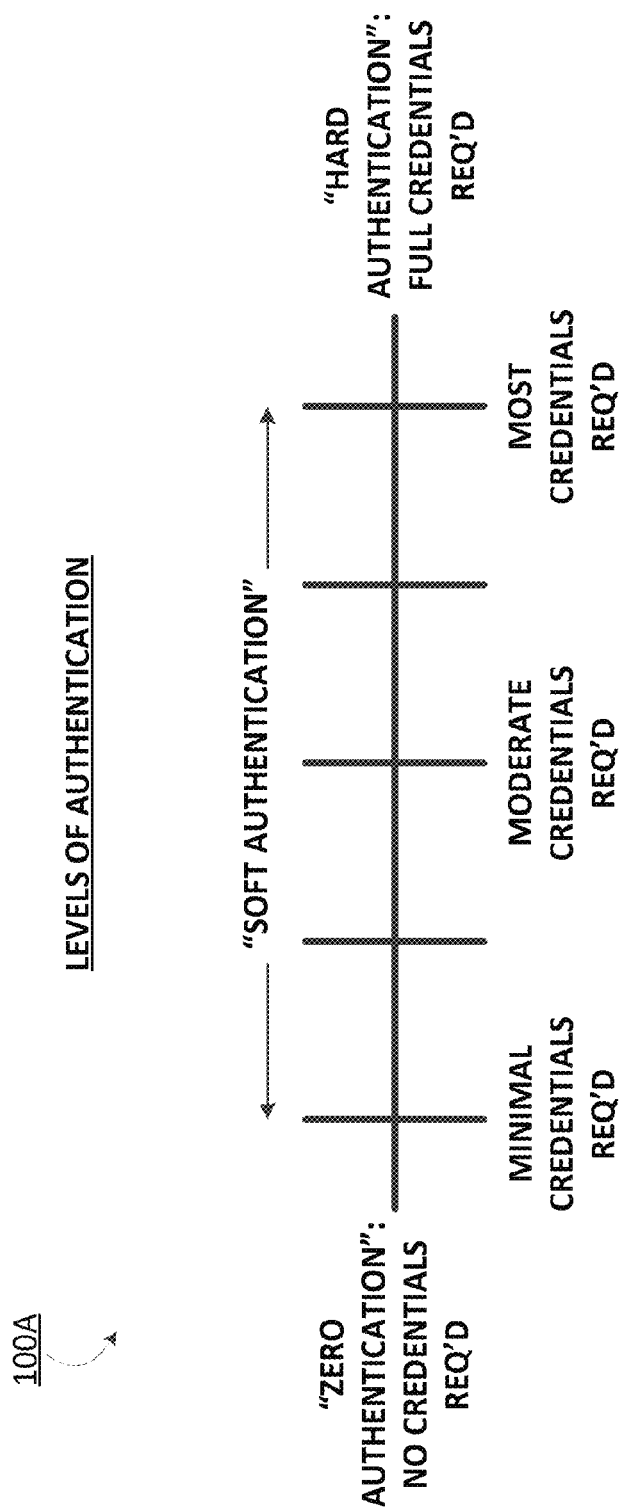
Figure 1B:
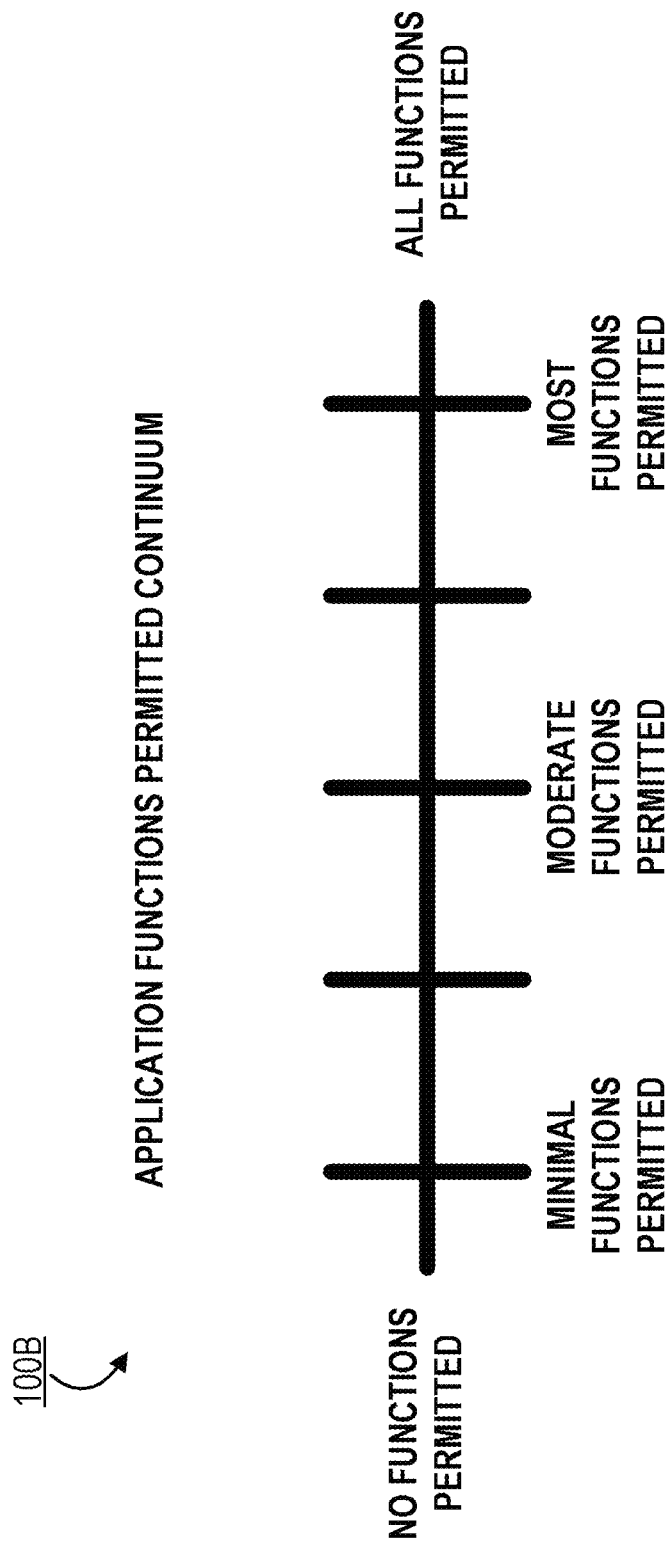
Figure 1C:
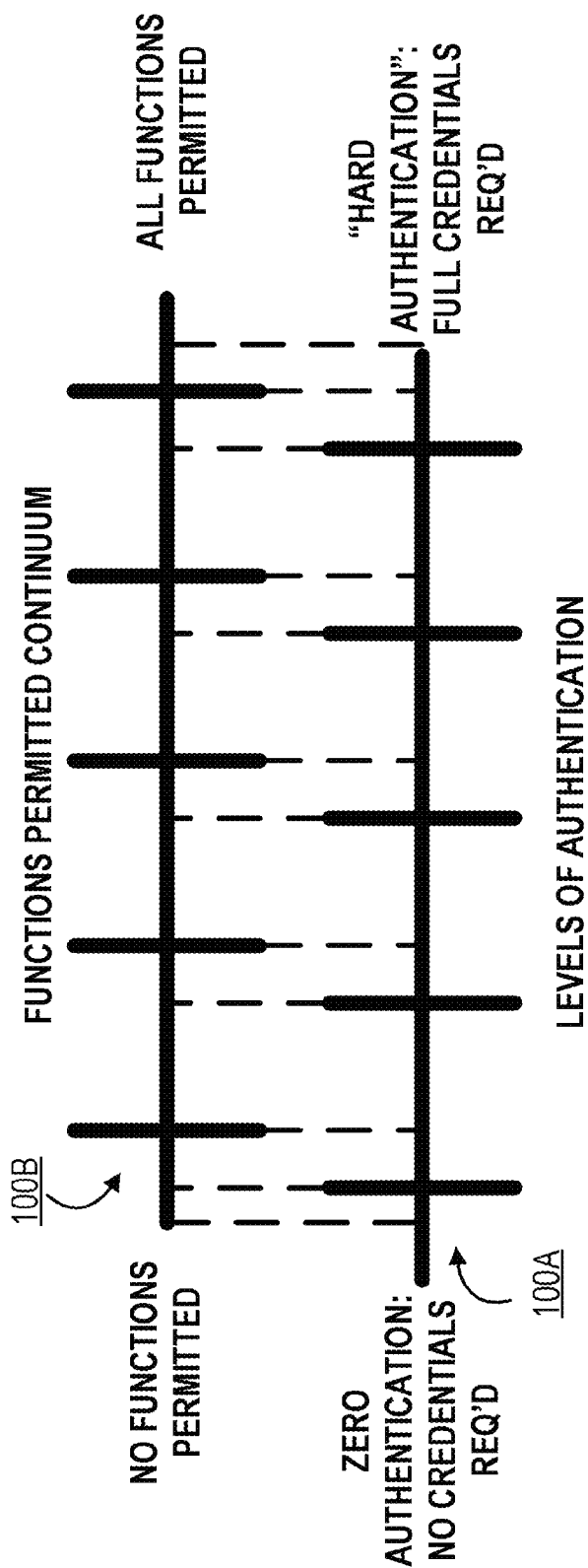
Figure 2:
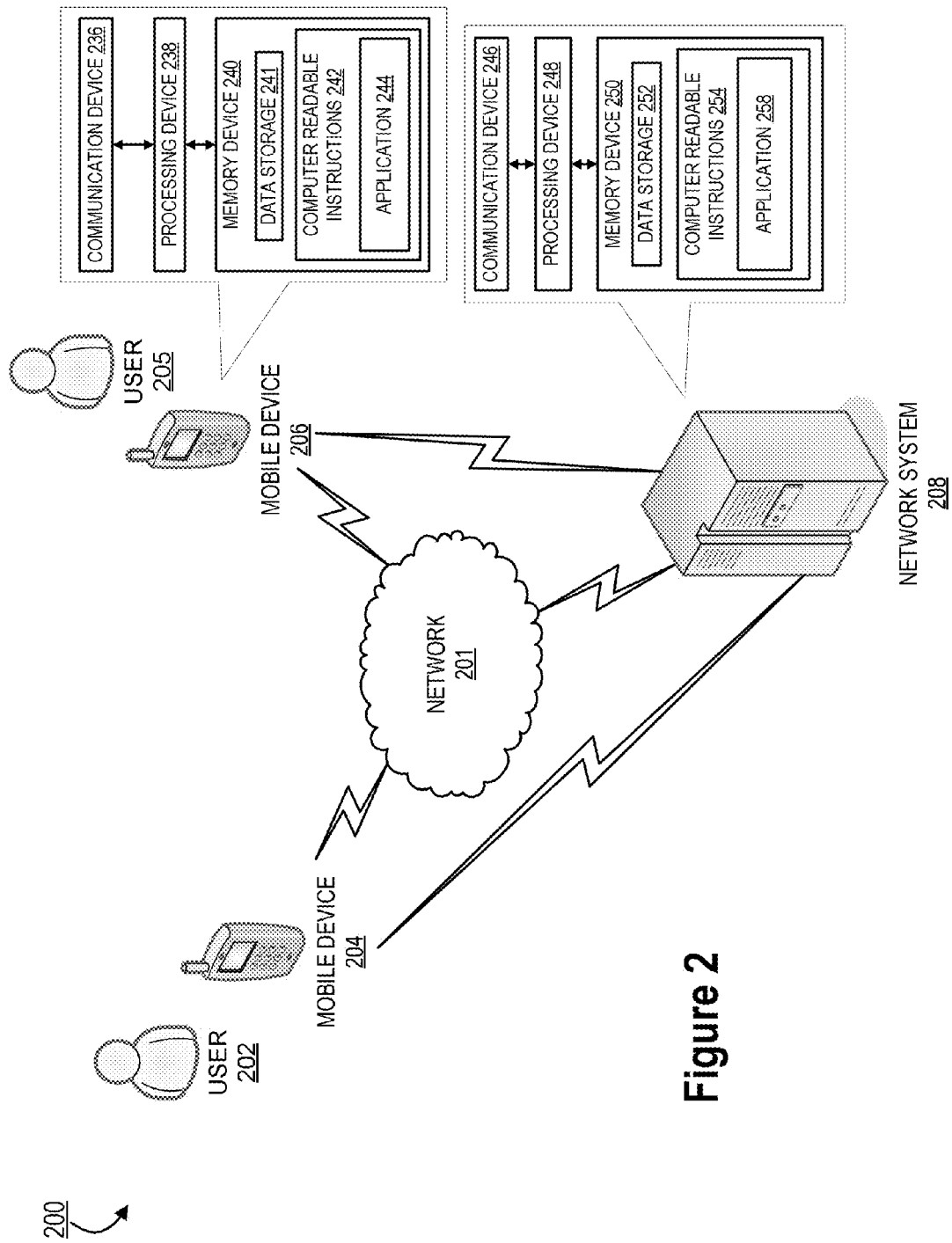
Figure 3A:
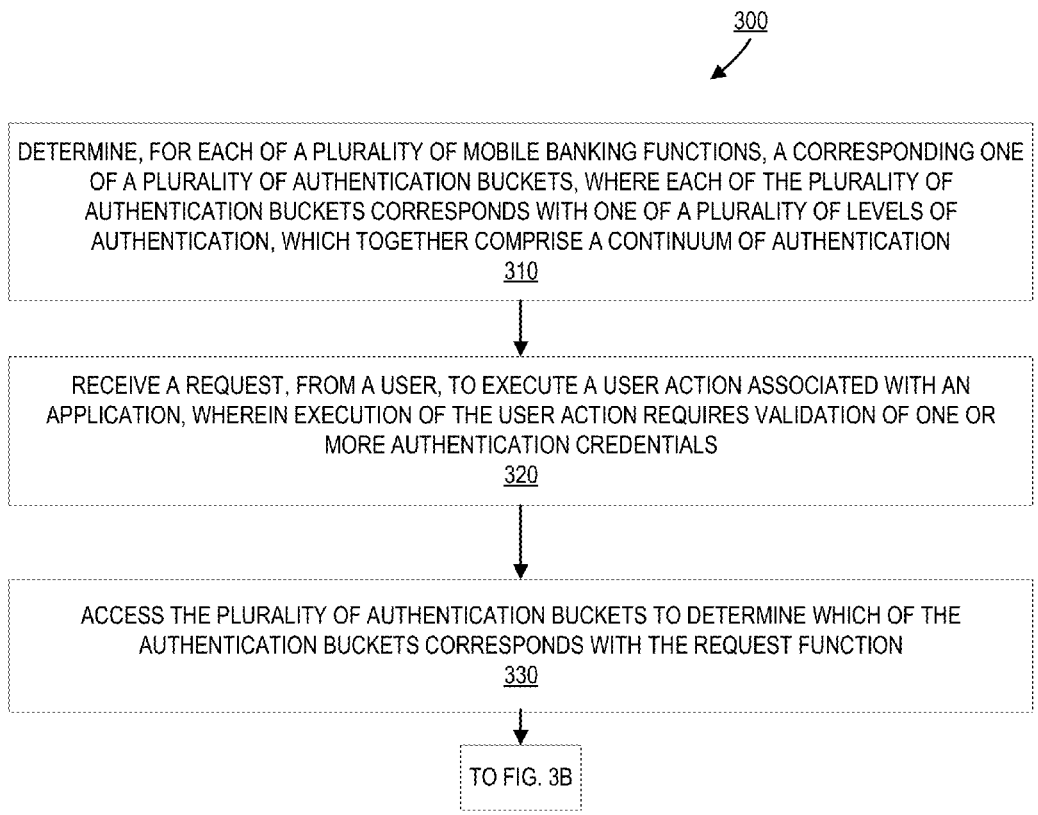
Figure 3B:
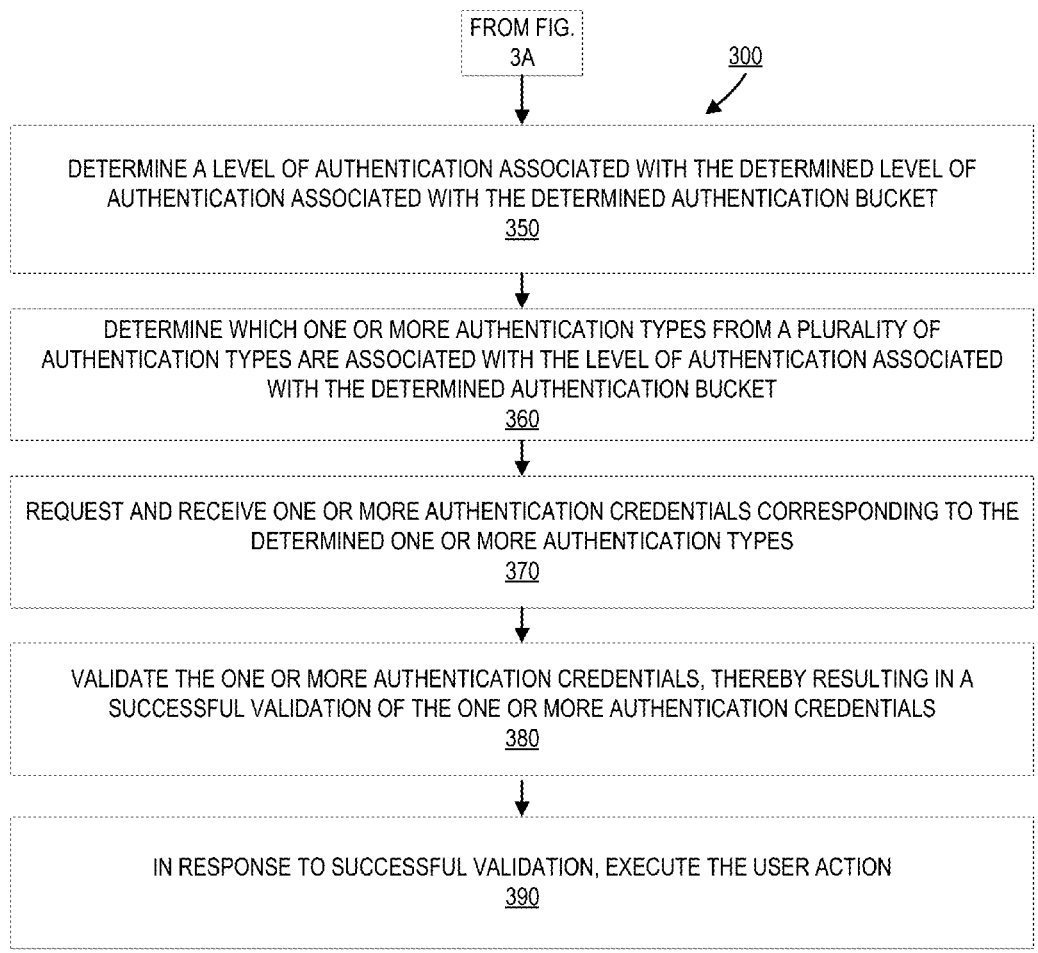

Having thus described embodiments of the invention in general terms, reference will now be made to the accompanying drawings, where:

FIG. 1A provides a diagram illustrating an authentication continuum, in accordance with an embodiment of the present invention;

FIG. 1B provides a diagram illustrating an application functions permitted continuum, in accordance with an embodiment of the present invention;

FIG. 1C provides a diagram illustrating multiple continuums, in accordance with an embodiment of the present invention;

FIG. 2 provides a diagram illustrating a network environment for providing authentication using previously-validated authentication credentials, in accordance with an embodiment of the present invention; and FIGS. 3A and 3B provides a flow diagram illustrating a method for sorting mobile banking functions into authentication buckets, in accordance with embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

User authentication may be required in a variety of situations. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 1A, a continuum of authentication 100A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 1C, the continuum of authentication 100A may be coupled with an application functions permitted continuum 100B, first illustrated in FIG. 1B.

Referring to FIG. 1B, the application functions permitted continuum 100B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted.

The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 100B corresponds with a certain amount and/or number of functions that are permitted and/or the context in which certain functions are permitted.

Referring now to FIG. 1C, a diagram 100C illustrates a coupling of the application functions permitted continuum 100B and the levels of authentication continuum 100A. As shown, the continua 100B and 100A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 100B provides that a particular function or functions may be permitted given that a specified level of authentication credentials are supplied, as indicated by the corresponding point on continuum 100A. For example, a financial institution and/or a user may arrange the continua 100B and 100A with respect to one another and may adjust the arrangement based on changing desires or goals.

In some embodiments, one or both the continua 100B and 100A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 2, a network environment 200 is illustrated in accordance with one embodiment of the present invention. As illustrated in FIG. 2, the network system 208 is operatively coupled, via a network 201 to the mobile device 204 and/or 206. In this configuration, the network system 208 may send information to and receive information from the mobile device devices 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258. The application 258 may perform a user authentication by performing one or more of the steps and/or sub-steps discussed herein.

As illustrated in FIG. 2, the mobile device 206 generally comprises a communication device 236, a processing device 238, and a memory device 240. The processing device 238 is operatively coupled to the communication device 236 and the memory device 240. In some embodiments, the processing device 238 may send or receive data from the mobile device 204, and/or the network system 208 via the communication device 236 over a network 201. As such, the communication device 236 generally comprises a modem, server, or other device for communicating with other devices on the network 201.

As further illustrated in FIG. 2, the mobile device 206 comprises computer-readable instructions 242 stored in the memory device 240, which in one embodiment includes the computer-readable instructions 242 of an application 244. In the embodiment illustrated in FIG. 2, the application 244 allows the mobile device 206 to be linked to the network system 208 to communicate, via a network 201. The application 244 may also allow the mobile device 206 to connect directly (i.e., locally or device to device) with the mobile device 204 for proximity services (e.g., using either cellular based links or non-cellular based links). The application 244 may perform a user authentication by performing one or more of the steps and/or sub-steps discussed herein.

It is understood that the servers, systems, and devices described herein illustrate one embodiment of the invention. It is further understood that one or more of the servers, systems, and devices can be combined in other embodiments and still function in the same or similar way as the embodiments described herein.

Various embodiments of the invention provide predetermined buckets for sorting mobile banking functions. The buckets may be predetermined by the financial institution based on the level(s) of authentication it wants to require for the various functions. The buckets may also be modified by customers.

Each bucket is associated with different levels of authentication. For example, if a user desires to view a mobile banking application startup screen, certain non-sensitive and/or public information may be made available to the user with little or no authentication. In this case, those functions may be sorted into a "no authentication" bucket. On the other hand, if the user desires to view a transaction history or conduct a transaction, such functions may require different, typically harder or more stringent authentication.

In various embodiments, the buckets may be labeled or arranged based on a continuum of levels of authentication such as that described with reference to FIG. 1A. For example, the continuum may go from zero authentication required to varying levels of soft authentication to varying levels of hard authentication to no access available.

In some embodiments, buckets may have a predetermined associated level of authentication, but the associated level of authentication is subject to change. For example, data collected based on the user's transactions and/or behaviors may influence what level of authentication is associated with a particular bucket.

In some embodiments, a rules engine maps the functions into the various buckets based on predetermined rules. In some cases, a function may move from one bucket to another bucket (or from one side of a "wall" to the other, so to speak) based on circumstances, such as the location of the mobile device, transactions of the mobile device and the like.

This "wall" for changing authentication regarding the buckets represents a threshold level of authentication on the continuum. It may be moved such that buckets on one side of the wall have soft authentication and buckets on another side of the wall have hard authentication. In some embodiments, the wall is incorporated into a user interface for manipulating the functions, buckets and levels of authentication. Movement of the wall may be performed by the system based on transactions, location, behavior and the like. For example, if the mobile device is outside a certain geography, then the authentication for a particular function, bucket or set of buckets may change because a different level of authentication may be required to grant access to the function.

Referring now to FIG. 3A, a flowchart illustrates a method 300 for sorting mobile banking functions into authentication buckets. The first step, represented by block 310, is to determine, for each of the plurality of mobile banking functions, a corresponding one of a plurality of authentication buckets, where each of the buckets corresponds with one of a plurality of levels of authentication. These levels of authentication, as discussed above, together form a continuum of authentication. The next step, represented by block 320, is to receive a request, from a user, to execute a user action associated with an application, where execution of the user action requires validation of one or more authentication credentials. Typically, the application may include one or more user actions or functions. For example, a mobile financial application may include functions such as a funds transfer, a check deposit, a balance check, a bill pay, or the like. In another example, the user action may be checking account balance, executing a money transfer, initiating a bill pay to a merchant, or the like.

The next step, represented by block 330, is to access the plurality of authentication buckets to determine which of the authentication buckets corresponds with the requested function.

Referring now to FIG. 3B, the next step, represented by block 350, is to determine a level of authentication associated with the determined authentication bucket. Then, the system may be configured to determine which one or more authentication types from a plurality of authentication types are associated with the level of authentication associated with the authentication bucket, as shown in block 360. As illustrated in at least FIG. 1A, the one or more authentication levels may include a hard authentication, a soft authentication, and a zero authentication. In one aspect, the authentication types may include a username, a password, a personal identification number, biometric data, or the like. In some embodiments, each authentication level may include one or more authentication types in the continuum of authentication.

In response to determining one or more authentication types, the system may be configured to request one or more authentication credentials corresponding to the determined one or more authentication types, as shown in block 370. In response to requesting one or more authentication credentials, the system may be configured to receive one or more authentication credentials from the user and validate the one or more authentication credentials, thereby resulting in a successful validation of the one or more authentication credentials, as shown in blocks 370 and 380. In response to successful validation of the one or more authentication credentials, the system may then be configured to execute the user action, as shown in block 390. In one aspect, a successful validation may include determining a successful match between the one or more authentication credentials received from the user and the one or more authentication credentials stored in a database, wherein the one or more authentication credentials correspond to the one or more authentication types associated with the level of authentication.

Sorting the mobile banking functions into the authentication buckets may be done in a variety of methods. For example, in some embodiments, determining the appropriate bucket may include considering user behavior, such as by using a user pattern score, using a proximity transaction score, using a close network score or the like.

Determining a user pattern score may include determining a threshold associated with one or more apparatus activities, determining whether a current pattern of the user is within the threshold, and, based at least in part on the determination, assigning the user pattern score. The threshold(s) may be predetermined by the financial institution and/or may be predetermined and/or modified by the customer, such as by using the customer's online banking access. In some embodiments, determining the user pattern score includes selecting one or more second apparatus activities and determining a second threshold associated with the one or more second user patterns, determining whether the user is within the second threshold, where determining the user pattern score is further based at least in part on the determination of whether the user is within the second threshold. In some embodiments, determining the user pattern score includes determining a first partial score based at least in part on the determination of whether the user is within the threshold, where the first partial score is weighted by a first weighting factor and determining a second partial score based at least in part on the determination of whether the user is within the second threshold, and where the second partial score is weighted by a second weighting factor. The partial scores may then be combined such as by summing or multiplying to determine the user pattern score. The weighting factors may represent one or more user-defined preferences regarding their respective apparatus activities such as indicating which activities should be weighted more heavily. In some embodiments, determining the user pattern score includes determining a historical user pattern associated with the user, determining whether the set of data indicates a current pattern that falls within a predetermined acceptable variance of the historical pattern, and, if not, determining the user pattern score based at least in part on a variance of the current pattern from the historical pattern. In some embodiments, determining the user pattern score comprises determining a historical pattern associated with the user and determining the user pattern score based at least in part on a variance of the current pattern from the historical pattern. In various embodiments, the user pattern score may be looked up in a database to determine a corresponding level of authentication required for the user pattern score. In some cases, certain ranges of user pattern scores are assigned a particular level of authentication. In some cases, these levels of authentication are managed and predetermined by the financial institution and in some cases, the user/customer may either modify already predetermined levels of authentication and/or set the predetermined levels of authentication.

Determining a transaction proximity score may be done in a variety of methods. For example, in some embodiments, determining the transaction proximity score includes determining a time that has lapsed since completion of the one or more transactions. Next, a proximity threshold associated with the one or more transactions and the elapsed time may be determined. This may be done by accessing a database that includes a listing of pairs and/or ranges of proximity thresholds and/or elapsed times. Then, the proximity threshold is used to determine whether the user's request falls within the proximity threshold. For example, if the user performed a transaction ten minutes prior to the request within one mile of the request, then a proximity threshold of five miles maybe associated with the time since the transaction. In such a case, because the user's one mile distance falls below the proximity threshold of five miles, then an appropriate transaction proximity score may be assigned. Again, this assignment may be performed by accessing another or the same database to determine the score associated with the distance of one mile from the transaction that occurred ten minutes ago.

In some embodiments, determining the transaction proximity score also includes selecting one or more second transactions of the user and determining a second proximity threshold associated with the one or more second transactions of the user. This may be performed as described above. The next steps are determining whether the user is within the second proximity threshold, where determining the transaction proximity score is further based at least in part on the determination of whether the user is within the second proximity threshold.

In some cases, determining the transaction proximity score also includes determining a first partial score based at least in part on the determination of whether the user is within the proximity threshold, wherein the first partial score is weighted by a first weighting factor; and determining a second partial score based at least in part on the determination of whether the user is within the second proximity threshold, wherein the second partial score is weighted by a second weighting factor; and then combining the first partial score and the second partial score, thereby determining the transaction proximity score. The weighting factors may represent the proximity threshold range into which the user's distance from the transaction resides. For example, there may be multiple proximity thresholds and each may be assigned a weighting factor, such as a "1" for a proximity threshold of one mile and a "0.5" for a proximity threshold of five miles, etc.

In various embodiments, determining the transaction proximity score comprises determining a historical transaction pattern associated with the user; determining whether the transaction set of data indicates a current transaction pattern that falls within a predetermined acceptable variance of the historical transaction pattern; and, if not, determining the transaction proximity score based at least in part on a variance of the current transaction pattern from the historical transaction pattern. In other embodiments, determining the transaction proximity score comprises determining a historical transaction pattern associated with the user; and determining the transaction proximity score based at least in part on a variance of the current transaction pattern from the historical transaction pattern.

The movement and/or location of the apparatus may be determined in a variety of ways such as by collecting a set of data comprising information related to a physical location of the user. This set of data may be collected from a variety of sources and may include data drawn from one or more of the sources. The set of data may include positioning data of the customer, consistent with embodiments of the present invention.

The positioning data may include global positioning data. Global positioning data may include any information collected from methods, systems, apparatus, computer programs etc. involving locating a user's position relative to satellites, fixed locations, beacons, transmitters or the like. In some instances, global positioning data may be collected from a GPS device, such as a navigation system. Such a navigation system may be, but is not limited to, hardware and/or software that is part of a mobile phone, smartphone, PDA, automobile, watch etc. or a commercially available personal navigation system or the like. The amount, nature and type of the global positioning data that is collected may depend on the merchant's relationship with the customer and the amount of information that the customer has authorized the merchant or third-party provider to collect.

For instance, in some embodiments, the global positioning data will be snapshots of the user's location at different times. For example, a snapshot of the user's location may be collected each time the GPS software, navigation system or application is activated. The global positioning data may also include the destination entered by the user, recent searches for locations, attractions, addresses etc. In other instances, the global positioning data may be the complete route being provided to the GPS system's user, including destination, route, alternate routes, anticipated time of arrival etc. In some such embodiments, the global positioning data may include an indication if the customer selects a detour from a previously selected route, or instructs the navigation system to reach the desired location taking specific roads or avoiding certain roads.

Positioning data of the customer may include mobile device data. Mobile device data may include information regarding the location of the customer's mobile device. Such a mobile device may include, but is not limited to, a cellular telecommunications device (i.e., a cell phone or mobile phone), personal digital assistant (PDA), smartphone, a mobile Internet accessing device, or other mobile device including, but not limited to portable digital assistants (PDAs), pagers, gaming devices, laptop computers, tablet computers, and any combination of the aforementioned, or the like. For instance, the location of the mobile phone may be dynamically determined from the cell phone signal and cell towers being accessed by the mobile phone. In other instances, a mobile device may include software or hardware to locate the position of the mobile phone from GPS signals, wireless network locations, and the like. Mobile device data may further include information from an accelerometer that is a part of the mobile device and provides information regarding whether the mobile device is moving, and if so, in what direction. In some embodiments, mobile device data may be the time and location of calls placed using the telephone functionality of a mobile device. In yet other embodiments, the mobile device data may be data collected and analyzed by the hardware and/or software of the mobile device concerning the surrounding environment. In such embodiments, hardware, such as a video capture device, camera or the like and software that is stored in the memory of a mobile device captures a video stream of the environment surrounding the mobile device and through object recognition, compass direction, the location of the mobile device, and other such data identifies information about the objects identified in the surrounding environment and/or the environment itself. For example, in use, a user may use the camera built into her smartphone to collect a real-time video stream that includes images of the façade of a store front and the surrounding area. This image may include the store's name from a marquee, a street address (collected from an image of the numbers on the building and of street signs in the video image) and the direction the smartphone is facing (from a compass in the mobile device). Such information may be sufficient to locate the user's position and potentially the direction the user is facing and/or traveling.

Positioning data of the customer may also be collected from social network data. It will also be understood that "social network" as used herein, generally refers to any social structure made up of individuals (or organizations) which are connected by one or more specific types of interdependency, such as kinship, friendship, common interest, financial exchange, working relationship, dislike, relationships, beliefs, knowledge, prestige, geographic proximity etc. The social network may be a web-based social structure or a non-web-based social structure. In some embodiments, the social network may be inferred from financial transaction behavior, mobile device behaviors, etc. The social network may be a network unique to the invention or may incorporate already-existing social networks as well as any one or more existing web logs or "blogs," forums and other social spaces. Social network data may indicate the customer's recent, present or future location through expressed data. For instance, a user may upload a blog post, comment on a connection's page, send a friend an electronic message etc. that she is traveling to a specific location or that she is currently in a specific city, or on a specific road etc. Moreover, many already-existing social networks provide users with the ability to "check-in", "flag" or otherwise indicate the user's current location. Accordingly, customer positioning data collected from social networking data may consist of such indications. Furthermore, many social networks allow users to rate, like, comment etc. on restaurants, attractions, locations and the like. Accordingly, a customer may indicate that she ate at a certain restaurant or business at a given time and thereby provide information about her location at that time. Furthermore, a customer may upload photographs to a social networking site and thereby provide information about the customer's location. In some instances the customer's location may be determined from the picture, (for example a picture of a state line sign, a highway sign, a mile marker etc.) or a caption associated with the picture may indicate the customer's location and/or the time the photo was taken.

Positioning data of the customer may also be collected from Internet data. Internet data, may include any information relating to the searches conducted by the customer, website's visited by the customer and the like that suggests the customer's present or future location(s). For instance, in preparing for a vacation a customer may conduct searches for hotels, restaurants or activities in the area where the customer will be staying. Similarly, a customer may review weather forecasts for locations other than her place of residence indicating that she may soon be traveling to that location. A customer may also search for construction or traffic reports indicating future travel along certain roads. Moreover, changes in search patterns may suggest a customer's future location. For instance if a customer usually uses a web browser application just to read online news articles or to check sports scores but suddenly begins to search for camping gear, hiking manuals and boots it may be indicative that the customer is anticipating taking a hiking trip and will be traveling away from her home area. It will be understood that such Internet data may relate to searches or websites visited by the customer before she began traveling, however, inasmuch as many mobile devices also include mobile Internet connectivity, it will also be understood that such information may be dynamically collected as the customer travels.

Determining a close network score associated with the user may be done by selecting at least one member of a close network of the user. The next step is to determine a proximity threshold associated with the at least one member and the user. The next step is to determine whether the at least one member is within the proximity threshold. Next, in some embodiments, the mobile device and/or user select at least one member of a secondary, tertiary or further network of the user. The next step is to determine a second proximity threshold associated with the at least one member of the secondary network of the user. Next is to determine whether the at least one member of the secondary/tertiary or further network of the user is within the second proximity threshold. Finally, based at least in part on the determination(s), i.e., determinations of whether the member(s) of the user's network(s) are within their respective threshold(s), a close network score is assigned.

In various embodiments, a first partial score is determined based at least in part on the determination of whether the at least one member is within the proximity threshold. The first partial score may be weighted by a first weighting factor. Similarly, in some embodiments, a second partial score is determined based at least in part on the determination of whether the at least one member of the secondary network of the user is within the second proximity threshold. The second partial score may be weighted by a second weighting factor. The weighting factors may represent the level of connection of the member of the user's network. For example, those members of the network that are "close" connections such as core family members may be assigned a weighting factor of "1", whereas those members of the network that are extended family members may be assigned a weighting factor of "0.5", etc. In a case where there are multiple partial scores, they may then be combined such as by summing or multiplying, thereby determining the close network score.

In various embodiments, the close network score may be looked up in a database to determine a corresponding level of authentication required for the close network score. In some cases, certain ranges of close network scores are assigned a particular level of authentication. In some cases, these levels of authentication are managed and predetermined by the financial institution and in some cases, the user/customer may either modify already predetermined levels of authentication and/or set the predetermined levels of authentication.

In some embodiments, the system may receive user input regarding which of a plurality of network members should be used during authentication. In some cases, a user interface is presented that shows the user's network and allows the user to select which members of the network to use to determine the close network score.

In some embodiments, a second set of data is collected that includes information related to a physical location of the member(s) of the close (or distant) network of the user. Determining whether the at least one member is within the proximity threshold is then based on determining a distance between the user and the at least one member of the close network of the user and comparing the distance to the proximity threshold.

In various embodiments, one or more of the proximity thresholds discussed herein may be predetermined by the financial institution and/or may be modified or predetermined by the user/customer using a user interface presented by the financial institution.

In various embodiments, the system initiates presentation of a user interface illustrating at least one of the plurality of authentication buckets and at least one of the functions corresponding to the at least one authentication bucket. In some cases, the system receives user input selecting one of the plurality of authentication buckets for one of the plurality of functions. In some embodiments, the system initiates presentation of a user interface illustrating a set of available buckets for one of the plurality of functions based at least in part on predetermined thresholds of authentication corresponding to the function. In some embodiments, the system initiates presentation of a predetermined recommended authentication bucket for the at least one of the functions, the predetermined recommended authentication bucket being different from the at least one authentication bucket corresponding to the at least one of the functions. Finally, in some embodiments, the system initiates presentation of a representation of a percentage of a plurality of customers of a financial institution administering the mobile banking functions that have selected each of a plurality of available authentication buckets for one of the plurality of functions.

In various embodiments, the system determines a current level of authentication corresponding to a first authentication bucket comprising a plurality of mobile banking functions, collects a set of circumstantial data corresponding with the apparatus, determines a circumstances score based at least in part on the set of circumstantial data, and determines whether the current level of authentication corresponding to the first authentication bucket is appropriate based at least in part on the circumstances score.

Determining a circumstances score may include determining a first partial score comprising a potential exposure score associated with one or more negative events indicated by the set of circumstantial data and determining a second partial score comprising a mitigating score associated with one or more positive events indicated by the set of circumstantial data. Then, the partial scores may be combined such as by summing or multiplying to determine the circumstances score. In some cases, the system applies a first weighting factor to the first partial score and a second weighting factor to the second partial score.

In some embodiments, the system determines that the current level of authentication corresponding to the first authentication bucket is inappropriate and determines an appropriate level of authentication for the first authentication bucket based on applying the set of circumstantial data to a set of sorting rules.

In some cases, the set of sorting rules are predetermined by a financial institution administering the mobile banking functions, and the system receives user input selecting one of the plurality of authentication buckets for re-sorting one of the plurality of functions.

In some embodiments, the system receives a request, from a user, to access one of the plurality of functions, accesses the plurality of authentication buckets to determine which of the authentication buckets corresponds with the requested function, determines the level of authentication associated with the determined authentication bucket, determines which one or more authentication types from a plurality of authentication types are associated with the level of authentication associated with the determined authentication bucket, requests one or more authentication credentials corresponding to the determined one or more authentication types, receives one or more authentication credentials from the user, validates the one or more authentication credentials, thereby resulting in a successful validation of the one or more authentication credentials, and, in response to the successful validation of the one or more authentication credentials, enable access to the function requested by the user.

In various embodiments, the level of user authentication may also be based in part on validating an identity of the mobile device of the user. Such verification can be incorporated into the close network score or into a unique identity score that is combined with the close network score in order to determine the appropriate level of authentication required for a requested action/function. The identity of the mobile device may be determined in a variety of ways. For example, a particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above para graphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
|---|---|---|
| 14/175,639 (now published as U.S. patent application Publication No. 2015/0227926) | DETERMINING USER AUTHENTICATION REQUIREMENTS BASED ON THE CURRENT LOCATION OF THE USER IN COMPARISON TO A USERS'S TRAVEL ROUTE | Feb. 7, 2014 |
| 14/175,643 (now published as U.S. patent application Publication No. 2015/0227727) | DETERMINING USER AUTHENTICATION REQUIREMENTS BASED ON THE CURRENT LOCATION OF THE USER IN COMPARISON TO THE USERS'S NORMAL BOUNDARY OF LOCATION | Feb. 7, 2014 |
| 14/175,646 (now published as U.S. patent application Publication No. 2015/0227728) | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Feb. 7, 2014 |
| 14/175,701 (now published as U.S. patent application Publication No. 2015/0229623) | USER AUTHENTICATION BASED ON HISTORICAL TRANSACTION DATA | Feb. 7, 2014 |
| 14/175,947 (now published as U.S. patent application Publication No. 2015/0229624) | USER AUTHENTICATION BASED ON HISTORICAL USER BEHAVIOR | Feb. 7, 2014 |
| 14/175,954 (now published as U.S. patent application Publication No. 2015/0229650) | USER AUTHENTICATION BY GEO-LOCATION AND PROXIMITY TO USER'S CLOSE NETWORK | Feb. 7, 2014 |
| 14/175,863 (now published as U.S. patent application Publication No. 2015/0227731) | USER AUTHENTICATION BASED ON OTHER APPLICATIONS | Feb. 7, 2014 |
| 14/175,615 (now published as U.S. patent application Publication No. 2015/0227726) | USER AUTHENTICATION BASED ON FOB/INDICIA SCAN | Feb. 7, 2014 |
| 14/175,688 (now published as U.S. patent application Publication No. 2015/0227730) | USER AUTHENTICATION BASED ON SELF-SELECTED PREFERENCES | Feb. 7, 2014 |
| 14/175,136 (now published as U.S. patent application Publication No. 2015/0229622) | SHUTTING DOWN ACCESS TO ALL USER ACCOUNTS | Feb. 7, 2014 |
| 14/175,771 (now published as U.S. patent application Publication No. 2015/0227903) | REMOTE REVOCATION OF APPLICATION ACCESS BASED ON LOST OR MISAPPROPRIATED CARD | Feb. 7, 2014 |
| 14/175,786 (now published as U.S. patent application Publication No. 2015/0227927) | REVOCATION OF APPLICATION ACCESS BASED ON NON-CO-LOCATED | Feb. 7, 2014 |
| 14/175,672 (now published as U.S. patent application Publication No. 2015/0227729) | SELF-SELECTED USER ACCESS BASED ON SPECIFIC AUTHENTICATION TYPES | Feb. 7, 2014 |
| 14/175,146 (now published as U.S. patent application Publication No. 2015/0227926) | PROVIDING AUTHENTICATION USING PREVIOUSLY-VALIDATED AUTHENTICATION CREDENTIALS | Feb. 7, 2014 |
| 14/175,652 (now published as U.S. patent application Publication No. 2015/0227924) | DETERMINING AUTHENTICATION REQUIREMENTS ALONG A CONTINUUM BASED ON A CURRENT STATE OF THE USER AND/OR THE SERVICE REQUIRING AUTHENTICATION | Feb. 7, 2014 |
| 14/175,962 (now published as U.S. patent application Publication No. 2015/0229625) | AUTHENTICATION LEVEL OF FUNCTION BUCKET BASED ON CIRCUMSTANCES | Feb. 7, 2014 |
| 15/016132 | SORTING MOBILE BANKING FUNCTIONS INTO AUTHENTICATION BUCKETS | Feb. 4, 2016 |

What is claimed is:

1. A computer program product for sorting mobile banking application functions into different authentication buckets where each authentication bucket has an associated different level of authentication requirements which together comprise a continuum of authentication, the computer program product comprising a non-transitory computer-readable medium comprising code causing a mobile device of a user to:
receive a request, from a user, to access one of the plurality of mobile banking application functions of a mobile banking application running on the mobile device;
access the plurality of authentication buckets to determine which of the authentication buckets corresponds with the requested function;
determine the level of authentication associated with the determined authentication bucket;
determine which one or more authentication types from a plurality of authentication types are associated with the level of authentication associated with the determined authentication bucket;
determine that the mobile device has recently performed an authenticated transaction;
determine that a location of the mobile device is within a certain geography;
based on the recently performed authenticated transaction and the location of the mobile device, change the level of authentication required to access the mobile banking application function from the determined authentication bucket to a second authentication bucket having a lower level of authentication;
determine which second one or more authentication types from the plurality of authentication types are associated with the lower level of authentication of the second authentication bucket;
request one or more authentication credentials corresponding to the determined second one or more authentication types;
receive one or more authentication credentials from the user;
successfully validate the one or more authentication credentials; and
in response to the successful validation of the one or more authentication credentials, enable access to the mobile banking application function requested by the user.

2. The computer program product of claim 1, wherein the code further causes the first apparatus to:
initiate presentation of a user interface illustrating at least one of the plurality of authentication buckets and at least one of the functions corresponding to the at least one authentication bucket.

3. The computer program product of claim 1, wherein the code further causes the first apparatus to:
receive user input selecting one of the plurality of authentication buckets for one of the plurality of functions.

4. The computer program product of claim 1, wherein the code further causes the first apparatus to:
initiate presentation of a user interface illustrating a set of available buckets for one of the plurality of functions based at least in part on predetermined thresholds of authentication corresponding to the function.

5. The computer program product of claim 2, wherein the code further causes the first apparatus to:
initiate presentation of a predetermined recommended authentication bucket for the at least one of the functions, the predetermined recommended authentication bucket being different from the at least one authentication bucket corresponding to the at least one of the functions.

6. A method for sorting mobile banking application functions into different authentication buckets, the method comprising:
receiving a request, by the mobile device and from the user, to access one of the plurality of mobile banking application functions of a mobile banking application running on the mobile device;
accessing, by the mobile device of the user, a storage device comprising, for each of a plurality of mobile banking application functions, a corresponding one of a plurality of authentication buckets, where each of the plurality of authentication buckets corresponds with one of a plurality of levels of authentication, which together comprise a continuum of authentication;
determining, by the mobile device of the user, from the plurality of authentication buckets which of the authentication buckets corresponds with the requested function;
determining, by the mobile device of the user, the level of authentication associated with the determined authentication bucket;
determining, by the mobile device of the user, which one or more authentication types from a plurality of authentication types are associated with the level of authentication associated with the determined authentication bucket;
determining that the mobile device has recently performed an authenticated transaction;
determining that a location of the mobile device is within a certain geography;
based on the recently performed authenticated transaction and the location of the mobile device, changing the level of authentication required to access the mobile banking application function from the determined authentication bucket to a second authentication bucket having a lower level of authentication;
determining which second one or more authentication types from the plurality of authentication types are associated with the lower level of authentication of the second authentication bucket;
requesting, by the mobile device of the user, one or more authentication credentials corresponding to the determined second one or more authentication types;
receiving, by the mobile device of the user, one or more authentication credentials from the user;
successfully validating, by the mobile device of the user, the one or more authentication credentials; and
in response to the successful validation of the one or more authentication credentials, enabling access to the mobile banking application function requested by the user.

7. The method of claim 6, further comprising:
initiating presentation of a user interface illustrating at least one of the plurality of authentication buckets and at least one of the functions corresponding to the at least one authentication bucket.

8. The method of claim 6, further comprising:
receiving user input selecting one of the plurality of authentication buckets for one of the plurality of functions.

9. The method of claim 6, further comprising:
initiating presentation of a user interface illustrating a set of available buckets for one of the plurality of functions based at least in part on predetermined thresholds of authentication corresponding to the function.

10. The method of claim 7, further comprising:
initiating presentation of a predetermined recommended authentication bucket for the at least one of the functions, the predetermined recommended authentication bucket being different from the at least one authentication bucket corresponding to the at least one of the functions.

11. The method of claim 7, further comprising:
initiating presentation of a representation of a percentage of a plurality of customers of a financial institution administering the mobile banking functions that have selected each of a plurality of available authentication buckets for one of the plurality of functions.

* * * * *